United States Patent [19]
Tan et al.

[11] Patent Number: 5,860,388
[45] Date of Patent: Jan. 19, 1999

[54] VACUUM REGULATOR

[75] Inventors: Jinglu Tan, Columbia, Mo.; Limin Wang, Springfield, Ill.

[73] Assignee: University of Missouri, Columbia, Mo.

[21] Appl. No.: 707,422

[22] Filed: Sep. 4, 1996

Related U.S. Application Data

[62] Division of Ser. No. 484,470, Jun. 7, 1995, Pat. No. 5,613,514.

[51] Int. Cl.$^6$ .............................. A01J 5/04; F16K 15/00
[52] U.S. Cl. .......................................... 119/14.44; 137/494
[58] Field of Search ............................. 119/14.08, 14.3, 119/14.43, 14.44; 137/505, 494, 505.11, 505.14, 505.34

[56] References Cited

U.S. PATENT DOCUMENTS

| | | | |
|---|---|---|---|
| 1,351,337 | 8/1920 | McArthur | 119/14.44 |
| 3,811,467 | 5/1974 | Jones | 137/494 |
| 4,033,295 | 7/1977 | Soderlund | 119/14.44 |
| 5,141,403 | 8/1992 | Guo et al. | 119/14.44 |
| 5,289,848 | 3/1994 | Jenisch, Jr. | 119/14.44 X |

*Primary Examiner*—Michael J. Carone
*Assistant Examiner*—Elizabeth Shaw
*Attorney, Agent, or Firm*—Hovey, Williams, Timmons & Collins

[57] ABSTRACT

A pressure regulator apparatus and method for controlling the pressure in a pressure system is disclosed. The pressure regulator broadly includes a pressure transducer and a regulator control circuit. The pressure transducer measures the pressure of the pressure system, and the regulator control circuit controls the pressure in the pressure system in response to the pressure reading of the pressure transducer. The regulator control circuit compares the measured pressure to a predetermined set-point value for maintaining the pressure within a predetermined optimal pressure range.

12 Claims, 4 Drawing Sheets

Microfiche Appendix Included
(1 Microfiche, 21 Pages)

VACUUM REGULATOR

RELATED APPLICATION

The present application is a Division of application Ser. No. 08/484,470, filed Jun. 7, 1995, titled VACUUM REGULATOR, now U.S. Pat. No. 5,613,514.

MICROFICHE APPENDIX

A microfiche appendix containing a source code of a computer program useful in accordance with the present invention is appended hereto as 1 sheet of microfiche containing 21 frames.

BACKGROUND OF THE INVENTION

1. Field of the Invention

The present invention relates to pressure regulators for controlling the pressure in pressure systems, and more particularly to a pressure regulator apparatus and method for controlling the pressure in a milking system by maintaining the pressure within a predetermined optimal range. As used herein, pressure is understood to mean absolute pressure which encompasses both vacuum and gauge pressure.

2. Description of the Prior Art

Pressure systems are used in many processes including milking systems, food production and processing systems, oil and gas distribution systems, and other manufacturing and distribution systems. Pressure systems typically include one or more pressure or vacuum pumps, one or more reserve tanks, pipelines, and a control valve for letting fluid flow into or out of the system to alter the pressure in the system.

For optimal pressure system operation, a steady pressure is desired. However, during use, the pressure of a pressure system varies due to fluid usage and loss by the components of the pressure system. Pressure regulators attempt to compensate for these variances by controlling the opening and closing of the control valve to maintain a desired pressure.

Prior art pressure regulators suffer from several limitations that limit their utility. For example, prior art pressure regulators are not rigorously designed to take into account the system dynamics of pressure systems and thus cannot be reconfigured for different pressure systems. Accordingly, prior art pressure regulators cannot be customized for optimal control of a specific installation.

A more particular limitation of prior art pressure regulators is that they do not control pressure in accordance with an optimal set-point. Thus, prior art pressure regulators often drift away from the desired pressure to a new pressure level when system fluid usage or other conditions change. As a result, when using prior art pressure regulators, it is necessary to frequently measure the pressure in the pressure system and recalibrate the pressure regulator.

Accordingly, there is a need for an improved pressure regulator that overcomes the limitations of the prior art. More particularly, there is a need for a pressure regulator that is designed to take into account the system dynamics of pressure systems so that it can be customized for optimal control of a specific installation. Additionally, there is need for a pressure regulator that controls pressure in a pressure system in accordance with an optimal set-point.

OBJECTS AND SUMMARY OF THE INVENTION

The present invention overcomes the problems outlined above and provides a distinct advance in pressure regulators. More particularly, the pressure regulator of the present invention can be customized for optimal control of a pressure system and controls the pressure in the pressure system in accordance with an optimal set-point.

The pressure regulator of the present invention broadly includes a pressure transducer and a regulator control circuit. The pressure transducer measures the pressure of a pressure system and the regulator control circuit controls the pressure in the pressure system in response to the pressure reading of the pressure transducer. The pressure regulator maintains a desired pressure within the pressure system by controlling the opening and closing of the pressure system control valve.

Advantageously, the regulator control circuit includes a microprocessor for comparing the measured pressure to a pre-determined set-point. If the measured pressure is different from the desired set-point, the microprocessor generates an appropriate control signal for opening or closing the pressure system's control valve. The opening and closing of the control valve controls the fluid flow into or out of the pressure system for maintaining the desired pressure in the pressure system.

In a preferred embodiment of the invention, the pressure regulator is operable for controlling the vacuum in a milking system.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
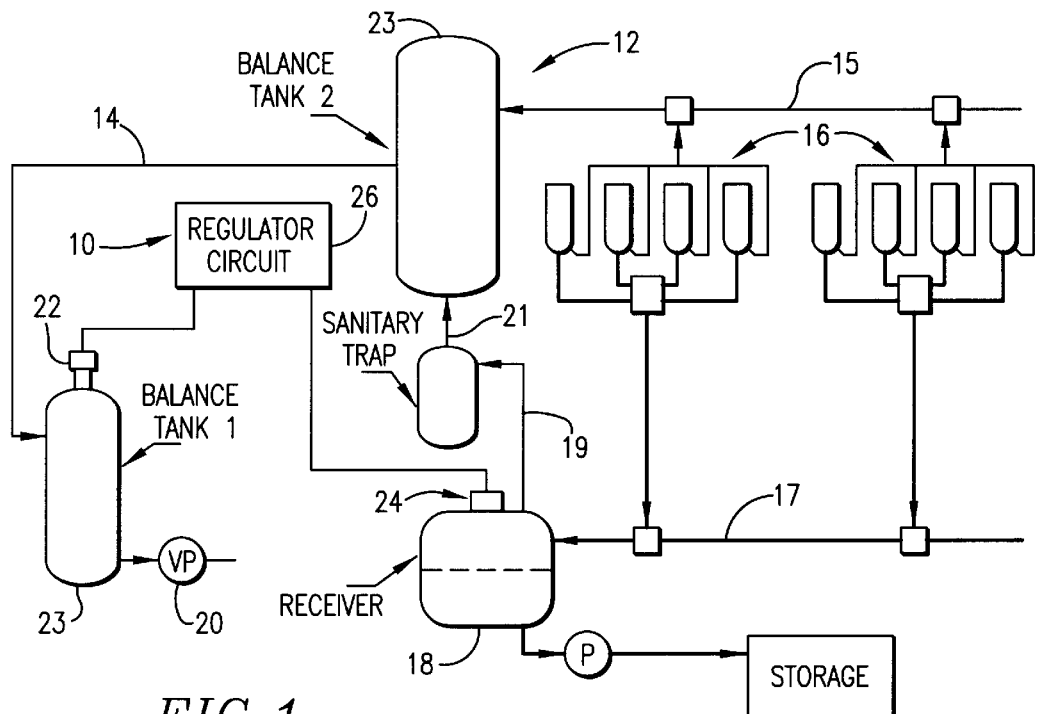
FIG. 1 is a schematic diagram of a pressure regulator apparatus shown coupled with a milking system.
Figure 2:
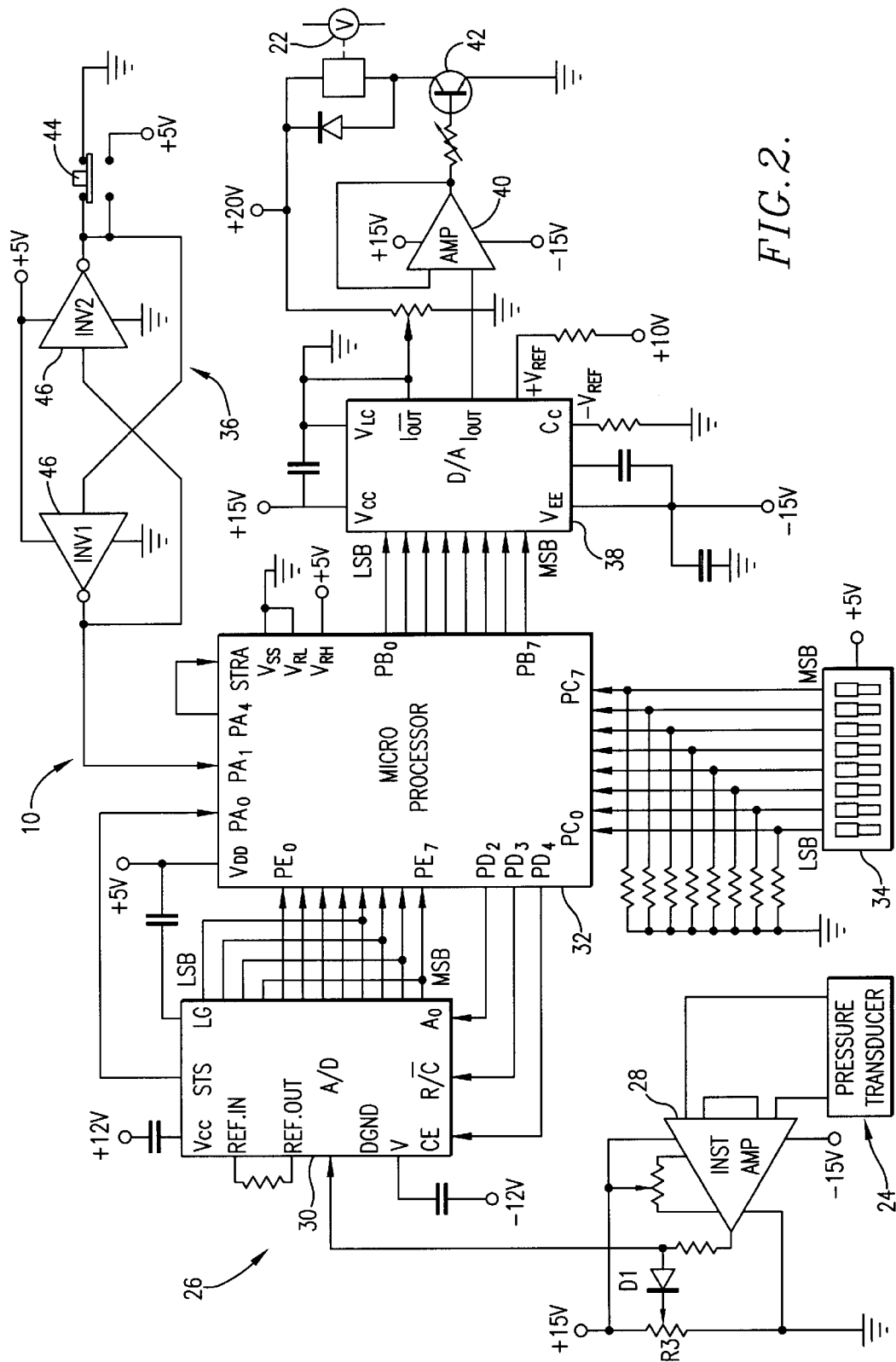
FIG. 2 is an electrical circuit diagram of the pressure regulator apparatus constructed in accordance with the preferred embodiment of the invention.

Turning now to FIGS. 1 and 2, a pressure regulator 10 constructed in accordance with a preferred embodiment of the invention is illustrated as an example to facilitate the following discussion and description. The pressure regulator 10 is preferably used for controlling the pressure or vacuum in a milking system 12 including pipelines line 14, 15, 17, 19, and 21 one or more milking stations 16 connected to the pipelines, a receiver tank 18 for receiving milk from the milking station 16, two balance tanks 23, a vacuum pump 20 for creating a vacuum within the system and a control servo valve 22 for introducing airflow into the milking system to alter the pressure in the milking system.

The pressure regulator 10 maintains a desired pressure within the milking system 12 by controlling the opening and closing of the milking system control servo valve 22. As best illustrated in FIG. 2, the pressure regulator broadly includes a pressure transducer 24 and a regulator control circuit 26. In general, the pressure transducer 24 measures the absolute pressure in the milking system 12, and the regulator control circuit 26 controls the pressure in the milking system 12 in response to this pressure measurement.

In more detail, the pressure transducer 24 is operable for measuring the actual pressure at any point in the milking system 12. The pressure transducer 24 measures the pressure and converts it into an analog pressure signal. The pressure transducer 24 is preferably a Model No. ITQ-1000 transducer manufactured by Kulite Semiconductor Products, Inc.

It is advantageous to position the pressure transducer 24 near the milking stations 16 of the milking system 12 since this is where the level of the pressure is the most important. Accordingly, as illustrated in FIG. 1, the pressure transducer 24 is preferably positioned on the milk receiver tank 18 of the milking system 12.

The regulator control circuit 26 controls the pressure in the milking system 12 in response to the analog pressure signal generated by the pressure transducer 24. The regulator control circuit 26 broadly includes an input amplifier 28, an analog-to-digital converter 30, a microprocessor 32, a dip switch 34, a pushbutton circuit 36, a digital-to-analog converter 38, an output amplifier 40, and a transistor 42. These components cooperate for controlling the opening and closing of the milking system control servo valve 22 to control the pressure in the milking system 12.

The input amplifier 28 receives the analog pressure signal from the pressure transducer 24 and amplifies the pressure signal for delivery to the analog-to-digital converter 30. The input amplifier 28 is preferably a type AD624 solid-state device.

The analog-to-digital converter 30 receives the amplified pressure signal from the input amplifier 28 and converts the analog signal into a 12-bit digital signal. A 12-bit digital signal is preferred to provide the desired control sensitivity. The analog-to-digital converter 30 is preferably a type AD674B solid-state device. Diode D1 and potentiometer R3 are coupled with the output of the input amplifier 28 to set an upper limit on the analog input to the analog-to-digital converter 30 to protect it from excessive current.

The microprocessor 32 controls the opening and closing of the milking system's 12 control servo valve 22 in response to the pressure signal generated by the pressure transducer 24. The preferred microprocessor 32 is a Model MC68HC11 type chip.

The microprocessor 32 receives the 12-bit digital pressure reading from the analog-to-digital converter 30 and compares this reading to a pre-determined pressure set-point. If the measured pressure is greater than the desired set-point, the microprocessor 32 generates a control signal for closing the milking system's 12 control servo valve 22. Conversely, if the measured pressure is less than the desired set-point, the microprocessor 32 generates a control signal for opening the milking system's 12 control servo valve 22. The control signals ramp the opening and closing of the control servo valve 22. The opening and closing of the control servo valve 22 controls the inflow of ambient air into the milking system 12 for maintaining the desired pressure in the milking system 12. The logic and operation of the microprocessor 32 are described in the Operation section below.

The dip switch 34 and the pushbutton circuit 36 are provided for entering control parameters and pressure set-points into the microprocessor 32. The dip switch 34 is a conventional 8-bit dip switch. The pushbutton circuit 36 includes a pushbutton switch 44 and a pair of inverters 46.

In the preferred embodiment, three control parameters $b_1$, $b_2$, and $b_3$ and a pressure set-point in Pascal are entered into the microprocessor 32. Each of these values are entered into the microprocessor 32 1-byte at a time by the dip switch 34. The pushbutton circuit 36 serves as an "Enter Key" for entering the values set on the dip switch 34. The entering of the control parameters and pressure set-point is discussed in detail in the Operation section below.

The digital-to-analog converter 38 receives the digital control signals from the microprocessor 32 and converts these signals into analog control signals. The digital-to-analog converter 38 is preferably a type DAC0800 solid-state device.

The output amplifier 40 receives the analog control signal from the digital-to-analog converter 38 and amplifies them for delivery to the transistor 42. The output amplifier 40 is preferably a type LM741 solid-state device.

The transistor 42 receives the amplified control signal and drives the milking system's 12 control servo valve 22 actuator to open or close the control servo valve 22 to alter the pressure of the milking system 12. The transistor 42 is preferably a type 2N1490 solid-state device.

OPERATION

Figure 5:
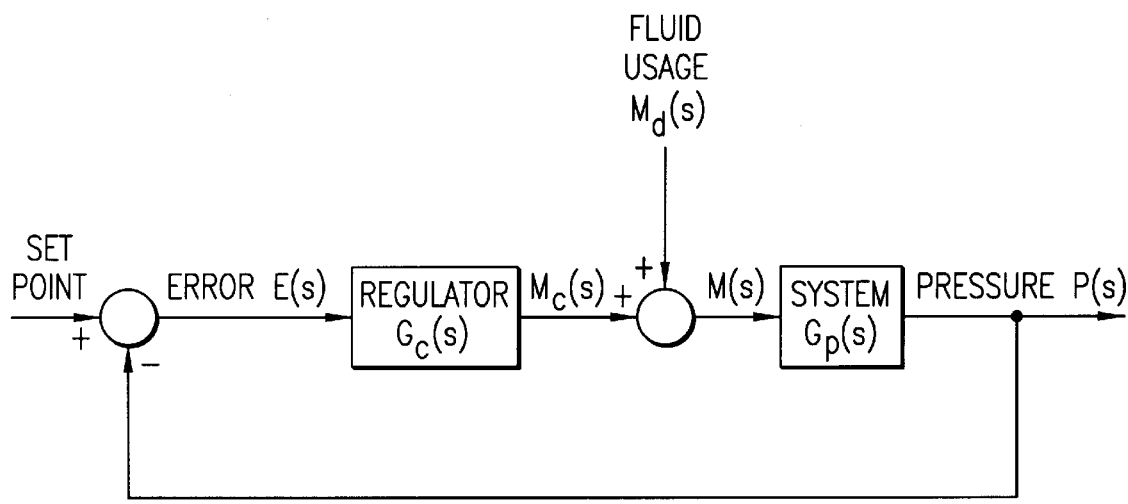
FIG. 5 is a block diagram of a closed-loop pressure control system.

The operation of the above-described pressure regulator 10 is based on applicant's modeling of the characteristics of typical pressure and vacuum systems. A block diagram of a closed-loop system is shown in FIG. 5. $G_p(s)$ is the pressure system transfer function from total fluid inflow M(s) to system pressure (or vacuum) P(s), fluid usage $M_d(s)$ is a disturbance to system pressure, and $M_c(s)$ is the fluid inflow determined by regular $G_c(s)$ from pressure error E(s). Proper design of regulator $G_c(s)$ requires knowledge of pressure system model $G_p(s)$. Applicant has discovered that pressure system dynamics can be described by the following equations and characteristics.

$$G_p(s) = \frac{p(s)}{M(s)} = \frac{K_p}{s+\alpha} \qquad \text{Equation 1}$$

with $$K_p = \frac{\gamma RT}{V}, \alpha = \frac{\gamma q}{V} \qquad \text{Equation 2}$$

where P is system pressure, M is mass fluid flow into the system, s is the Laplace variable, V is the total system internal volume, q is the pump 20 volume flow capacity (combined if multiple pumps are used), R is the gas constant, T is absolute ambient fluid temperature, and $\gamma$ is the heat capacity ratio for the fluid. This model has been validated on systems of different capacities and configurations and proven to be valid at frequencies where the dynamic behavior of the pressure system is most important.

Equation 1 indicates that the pressure system itself acts as a low-pass filter. Variations in fluid inflow above the frequency of $\alpha$ radians/s are attenuated in the pressure responses. The pressure regulator 10, therefore, only needs to provide additional compensation to block disturbances at low frequencies. This not only makes sense from dynamic considerations but also lowers hardware requirements for the regulator system. For disturbance rejection, a logical choice of the desired closed-loop transfer function from disturbance $M_d(s)$ to P(s) (see FIG. 5) is $$G_d(s) = \frac{P(s)}{m(s)} = \frac{K_p}{s+\alpha} \frac{K_c s}{s+\beta} \qquad \text{Equation 3}$$

where $K_c$ and $\beta$ are constants to be selected.

The first factor on the right-hand side of equation 3 is the plant (pressure system) transfer function, which blocks high-frequency fluid flow disturbances. The second factor is the additional compensation provided by the pressure regulator 10, which blocks low-frequency fluid flow disturbances. $K_c$ (<1) specifies a gain reduction over all frequencies. $\beta$ is the frequency below which the pressure regulator 10 should provide increased attenuation. $\beta$ should be greater than $\alpha$, $K_c$ and $\beta$ are determined based on the capabilities of the regulator hardware used.

Figure 6:
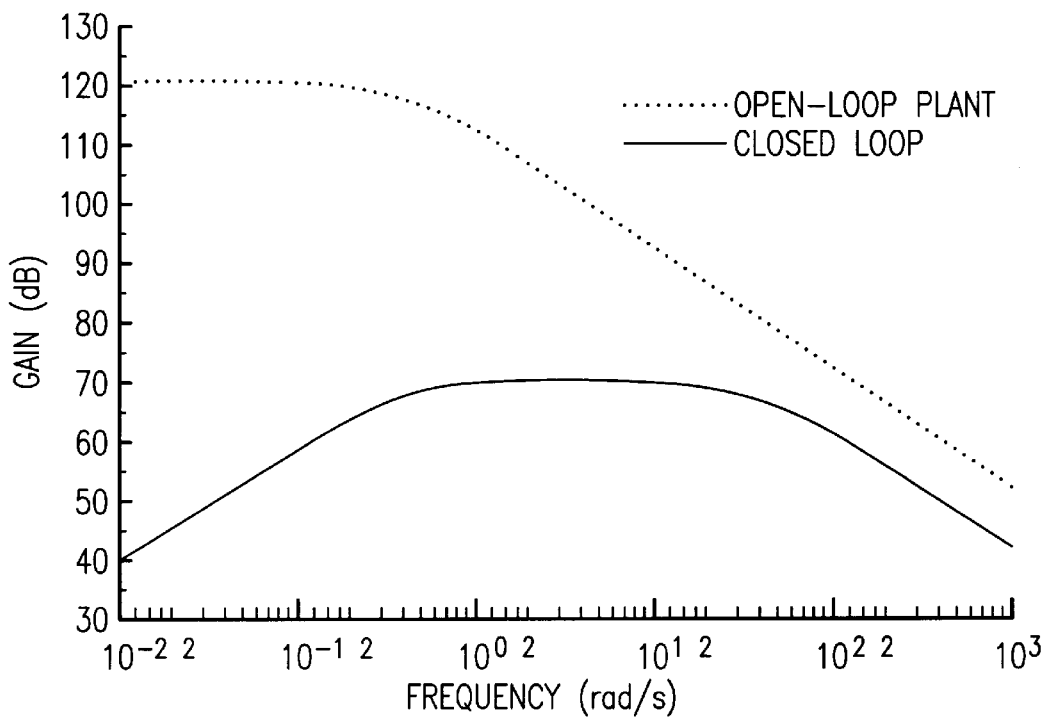
FIG. 6 is a Bode plot of open-loop plant and desired closed-loop transfer functions.

FIG. 6 shows the Bode plots of the desired closed loop $G_d(s)$ and open-loop plant $G_p(s)$ for the following conditions: The plant has a 0.0755-m³/s (80 CFM-ASME Standard) pump and 0.288-m³ internal volume, which gives $\alpha=0.367$ and $K_p=408776$ at T=293 K (20° C.). $K_c$ and $\beta$ are selected as $K_c=0.5$ and $\beta=100\alpha$. As shown by the difference between the two curves in FIG. 6, a pressure regulator satisfying the selected $G_d(s)$ would provide a considerable amount of additional attenuation to disturbances, especially at low frequencies.

In anticipation of digital implementation of the pressure regulator, a zeroth-order hold $G_h(s)$ should be added at the output of regulator $G_c(s)$ in FIG. 5 to account for the effects of discrete-time sampling and D/A conversion. The transfer function for a zeroth-order hold is usually simplified as follows:

$$G_h(s) = \frac{1 - e^{-\tau s}}{s} \approx \frac{2}{s + \frac{2}{\tau}} \qquad \text{Equation 4}$$

where $\tau$ is sampling period. Since a very small $\tau$ (about 0.01 s) is used in hardware implementation, the zeroth-order hold will primarily contribute to high-frequency dynamics. For a small $\tau$ and at low frequencies where the system dynamics is of concern, the zeroth-order hold can be further simplified to a gain $\tau$; i.e., $G_h(s) \approx \tau$. Realizing that the set-point in FIG. 5 is a constant, we can find the pressure regulator satisfying the desired closed-loop transfer as:

$$G_c(s) = \frac{G_p - G_d}{G_p G_d G_h} = \frac{(s+\alpha)(s+\delta)}{Bs} \qquad \text{Equation 5}$$

where:

$$\delta = \frac{\beta}{1 - K_c}, \quad B = \frac{K_p K_c \tau}{1 - K_c} \qquad \text{Equation 6}$$

Converting the pressure regulator in equation 5 from the s domain to the z domain by using matched pole and zero mapping yields the following digital regulator:

$$G_c(z) = \frac{K_z}{B} \frac{1 - (e^{-\alpha\tau} + e^{-\delta\tau})z^{-1} + e^{-(\alpha+\delta)\tau}z^{-2}}{1 - z^{-2}} \qquad \text{Equation 7}$$

Because the closed-loop gain is high between $\alpha$ and $\beta$ (FIG. 6), it is of interest to ensure that the gain in this frequency range is not changed by the conversion. This is accomplished by selecting $K_z$ so that equations 5 and 7 are equal at angular frequency $\alpha$; i.e., $$K_Z = \frac{2(\alpha + \delta)(e^{2\alpha\tau} - 1)}{e^{2\alpha\tau} - (e^{-\alpha\tau} + e^{-\delta\tau})e^{\alpha\tau} + e^{-(\alpha+\delta)\tau}} \qquad \text{Equation 8}$$

Equation 7 can be written into a digital regulator in the time domain as:

$$m_c(k) = m_c(k-2) + b_1 e(k) - b_2 e(k-1) + b_3 e(k-2) \qquad \text{Equation 9}$$

where $m_c$ is the fluid mass flow admitted by control servo valve 22 controlled by the pressure regulator, e is the error between the pressure set-point and the measured system pressure, k is an integer, and $$b_1 = \frac{K_z}{B} \qquad \text{Equation 10}$$

$$b_2 = \frac{K_z}{B} (e^{-\alpha\tau} + e^{-\delta\tau})$$

$$b_3 = \frac{k_z}{B} e^{-(\alpha+\delta)\tau}$$

Along with the pressure set-point, $b_1$, $b_2$, and $b_3$ are the four configuration parameters for the pressure regulator 10. The pressure set-point should be specified in Pa. $b_1$, $b_2$ and $b_3$ are dependent on the system capacities and the computation procedure is reiterated as follows:

(1) Use equation 2 to find plant gain $k_p$, and pole $\alpha$ from pump 20 volume flow rate q in m³/s and total system internal volume in m³. For air, R=287 Nm/kgK and $\gamma=1.4$. An average of absolute ambient fluid temperature in Kelvin should be used for T, such as 293 K.

(2) Choose a gain reduction factor $K_c$ and closed-loop pole value $\beta$ ($K_c=0.5$ and $\beta=100\alpha$ were found adequate for all the systems tested on and are thus recommended). Sampling period $\tau$ was set at 0.01125 s in the hardware implementation. Find pole $\delta$ and gain B with equation 6, and determine gain $K_z$ with equation 8.

(3) Determine $b_1$, $b_2$ and $b_3$ with equation 10.

The above-described modeling equations are incorporated into a control program in the instructions of the microprocessor 32 for controlling the operation of the regulator control circuit 26. The source code of the control program is reproduced in the attached microfiche appendix and its steps are illustrated in the flow diagram of FIG. 3. The control program employs software-implemented 24-bit floating-point arithmetics. Each floating-point number takes 5-bytes: 3-bytes for the mantissa, 1-byte for the exponent biased by hexadecimal 80, and 1-byte for the mantissa sign.

Figure 3:
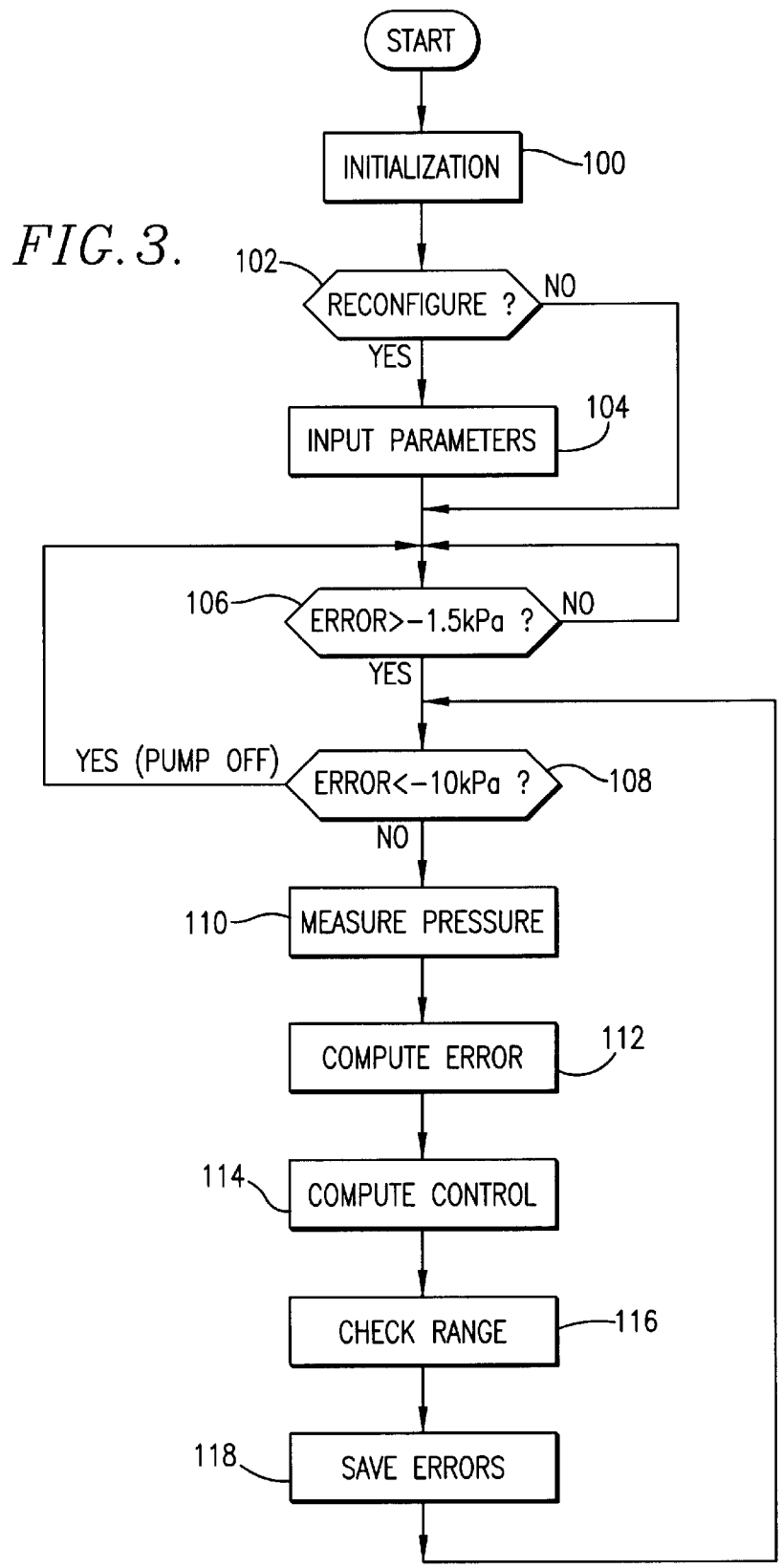
FIG. 3 is a flow diagram illustrating the control steps of the pressure regulator apparatus.

Referring to FIG. 3, the program enters at step 100 which initializes the pressure regulator control scheme by defining various variables. Step 102 then determines whether the control parameters are to be reconfigured. To do this, step 102 checks the status of the $PA_1$ port of the microprocessor 32 to see if the pushbutton switch 44 of the pushbutton circuit 36 has been depressed. When the pushbutton switch 44 is depressed, the answer to step 102 is yes; otherwise it is no.

If the answer to step 102 is no, the program continues at step 106. If the answer to step 102 is yes, the program proceeds to step 104 for inputting new control parameters. This step is part of the subroutine RDGAINS described in detail in the source code listed in the Appendix.

Step 104 first erases the old control parameters from the EEPROM of the microprocessor 32. Step 104 then waits to receive the control parameters $b_1$, $b_2$, and $b_3$ and the pressure set-point in Pa for reconfiguring the control scheme in the microprocessor 32. Each of the control parameters must be first converted to a 3-byte mantissa with the binary point to the left of the first non-zero most significant bit and a 1-byte exponent biased by hexadecimal 80. The pressure set-point must be first converted into a 2-byte integer.

The control parameters and the pressure set-point are entered into the microprocessor 32 in the form of fourteen 8-bit numbers. These numbers are entered one at a time by the dip switch 34 and the pushbutton circuit 36 into ports $PC_0$–$PC_7$ of the microprocessor 32. The control parameters are preferably entered in the following order: the exponent byte of $b_1$; the high, middle, and low mantissa bytes of $b_1$; 4-bytes for $b_2$ and 4-bytes for $b_3$ in the same order as for $b_1$; and the high and low bytes for the pressure set-point. After a byte is set on the dip switch 34, the pushbutton switch 44 of the pushbutton circuit 36 is depressed to enter the number into ports $PC_0$–$PC_7$ of the microprocessor 32.

Step 104 then stores the control parameters $b_1$, $b_2$, $b_3$ and the pressure set-point into memory and converts the pressure set-point into a floating-point number.

The program next moves to an error checking loop defined by step 106. Step 106 checks the difference between the pressure set-point and the actual system pressure measured by the pressure transducer 24. If the difference is not greater than a pre-determined value, the program enters a loop through step 106. This prevents the regulator algorithm from integral winding-up when the pump is off or recently turned on. In the preferred embodiment, the comparison pressure value in step 106 is 1.5 kPa.

If step 106 determines that the difference between the pressure set-point and the actual system pressure is within 1.5 kPa, the program proceeds to control loop consisting of steps 108–118. In the control loop, step 108 is another comparison to determine if the pump is turned off. In the preferred embodiment, the second comparison pressure value is 10 kPa. If the difference is less than –10 kPa, the program determines that the pressure system pump 20 is turned off and thus returns to step 106. However, if the difference is greater than –10 kPa, the program moves to steps 110–118 for adjusting the pressure of the pressure system.

Step 110 first reads the measured pressure from ports $PE_0$–$PE_7$ of the microprocessor 32. Steps 112 and 114 then compute the error value $e(k)$, and the control variables $b_1 e(k)$, $b_2 e(k-1)$, and $b_3 e(k-2)$. The control variables and a past controller output $m_c(k-2)$ are summed together according to equation 9 above to produce the current controller output.

Step 116 then checks the new controller output for proper limits, converts the controller output into an integer, and sends the controller output to the digital-to-analog converter 38 for controlling the opening and closing of the servo valve 22. Finally, step 118 saves the error and control output values for future control computations.

Figure 4:
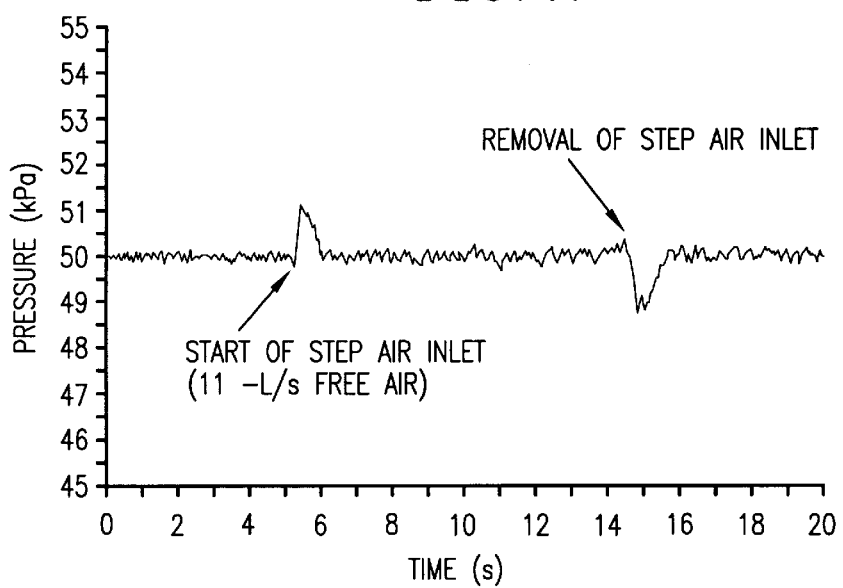
FIG. 4 is a graph illustrating the pressure regulator's response to disturbances in air usage in a pressure system.

FIG. 4 illustrates the operation of a prototype of the above described pressure regulator 10. The prototype included a 0.0755-m³/s (80 CFM) vacuum pump and 0.288-m³ internal system volume. With a selection of $K_c=0.5$ and $B=100\alpha$ as recommended, the computed configuration parameters were:

$b_1=0.0569$ $(0.E90F*16^{7C})_{hex}$
$b_2=0.0816$ $(0.A758*16^{7D})_{hex}$
$b_3=0.0248$ $(0.CB28*16^{7B})_{hex}$ The pressure set-point was 50 kPa. An ll-L/s free ambient air, about ⅓ of the vacuum pump 20 capacity at 50 kPa, was suddenly added at about 6 s and removed at about 15 s. This created step changes of considerable size in air usage. As seen from FIG. 4, the maximum overshoot was only about 1 kPa, which is very small considering the size of the disturbance. Recovery to the original set-point was immediate for practical purposes.

The curve shape of pressure deviations agrees with the desired closed-loop transfer function $G_d(s)$, so the pressure regulator performed as it was designed. Performance as shown by FIG. 4 or better was obtained on all systems tested. The overshoot was generally between 0.5 and 1 kPa for the above mentioned step changes in air usage.

Although the invention has been described with reference to the preferred embodiment illustrated in the attached drawing figures, it is noted that equivalents may be employed and substitutions made herein without departing from the scope of the invention as recited in the claims. For example, the pressure regulator of the present invention has been illustrated and described in conjunction with a milking system. Those skilled in the art will appreciate that the pressure regulator can also be used in other pressure systems including food production and processing systems and oil and gas distribution systems. Additionally, the control scheme of the pressure regulator can be implemented by various types of control hardware.

Having thus described the preferred embodiment of the invention, what is claimed as new and desired to be protected by letters patent includes the following:

1. In combination with a milking system including a vacuum pump for creating a vacuum within the system, a vacuum responsive milking station, pipelines for distributing the vacuum from the vacuum pump to the milking station to operate the milking station, the milking system being subject to vacuum pressure disturbances resulting from variable pressure usage by the milking station which can adversely affect the operation of the milking station, the milking system further including a valve for introducing ambient air into the system, the valve having fully open and fully closed positions, a pressure regulator for controlling the pressure of the system, said pressure regulator comprising:

measuring means for measuring the vacuum pressure of the milking system; and control means responsive to said measuring means for controlling the amount of air flow through said valve into the vacuum system said control means including comparing means for comparing the vacuum pressure measured by said measuring means with a predetermined set-point, and valve positioning means coupled between said comparing means and the valve and responsive to said comparing means for selectively ramping the valve to respective positions between said fully open and fully closed positions for letting selective amounts of ambient air into the milking system for maintaining the vacuum pressure of the milking system within a predetermined optimal pressure range corresponding to said pre-determined set-point.

2. The combination as set forth in claim 1, said control means including a microprocessor.

3. The combination as set forth in claim 1, said valve positioning means including a digital-to-analog converter and an amplifier circuit.

4. The combination as set forth in claim 1, said control means being operable for receiving control parameters associated with the milking system's operating dynamics for controlling the positioning of the valve in accordance with the control parameters.

5. The combination as set forth in claim 2, said control means further including a dip switch for inputting said control parameters and said set-point into said microprocessor.

6. The combination as set forth in claim 5, said measuring means including a pressure transducer for measuring the vacuum pressure of the milking system and for generating an analog pressure signal representative of said pressure.

7. The combination as set forth in claim 6, including amplifying means for amplifying said analog pressure signal and converting means for converting said amplified analog pressure signal to digital format for delivery to said microprocessor.

8. The combination as set forth in claim 1, the valve including a servo valve.

9. A pressure system comprising:

pumping means for adding fluids to or removing fluids from the system;

a dynamic pressure responsive working station requiring compressed or expanded fluids at a steady pressure;

means operably coupling said pumping means and said working station for conveying the fluids to or removing the fluids from said working station, the pressure system being subject to pressure disturbances resulting from variable fluid usage by the working station which can adversely affect the operation of the working station;

a valve for letting fluid flow into or out of the pressure system, said valve having fully open and fully closed positions; and a pressure regulator for maintaining the pressure of the pressure system within a pre-determined optimal pressure range, said pressure regulator including measuring means for measuring the pressure of the pressure system; and control means responsive to said measuring means for controlling the amount of fluid flow through said valve into or out of the pressure system, said control means including comparing means for comparing the pressure measured by said measuring means with a pre-determined set-point, and valve positioning means responsive to said comparing means for selectively ramping the valve to respective positions between said fully open and fully closed positions for letting selective amounts of fluid flow into or out of the pressure system to maintain the pressure of the pressure system within said optimal pressure range, said control means including a microprocessor operable for generating a control signal when the measured pressure is not equal to said set-point, said control means further including a dip switch coupled with said microprocessor for setting numbers representative of said set-point and a push-button switch coupled with said microprocessor for entering the numbers set on said dip switch into said microprocessor.

10. The pressure system as set forth in claim 9, said valve being a servo valve.

11. The pressure system as set forth in claim 10, the pressure system being a vacuum system and the fluid being air, said valve positioning means being operable for selectively opening said servo valve to respective ones of said positions between said fully open and fully closed positions for introducing ambient air into the vacuum system for maintaining the vacuum pressure in the pressure system within said desired pressure range corresponding to said pre-determined set-point.

12. The pressure system as set forth in claim 9, said control means further including configuration means for reconfiguring said comparing means and said valve positioning means to account for the dynamic characteristics of the pressure system.

* * * * *